United States Patent
Kolhouse et al.

(10) Patent No.: US 11,499,490 B1
(45) Date of Patent: Nov. 15, 2022

(54) SYSTEMS AND METHODS TO MINIMIZE EMISSIONS SPIKES WHEN REACTIVATING OR DEACTIVATING A COMBUSTION CYLINDER

(71) Applicants: Cummins Inc., Columbus, IN (US); Tula Technology, Inc., San Jose, CA (US)

(72) Inventors: J. Steven Kolhouse, Columbus, IN (US); Avra Brahma, Fishers, IN (US)

(73) Assignees: Cummins Inc., Columbus, IN (US); Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/544,568

(22) Filed: Dec. 7, 2021

(51) Int. Cl.
| | |
|---|---|
| *F02D 41/00* | (2006.01) |
| *F02D 13/02* | (2006.01) |
| *F02D 41/14* | (2006.01) |
| *F01L 13/00* | (2006.01) |

(52) U.S. Cl.
CPC ..... *F02D 41/0087* (2013.01); *F02D 13/0242* (2013.01); *F02D 41/0072* (2013.01); *F02D 41/1454* (2013.01); *F01L 2013/001* (2013.01); *F02D 2250/36* (2013.01)

(58) Field of Classification Search
CPC .......................... F02D 41/0087; F02D 2250/36
USPC ............................................. 123/198 F, 481
See application file for complete search history.

(56) References Cited

U.S. PATENT DOCUMENTS

| | | | |
|---|---|---|---|
| 6,953,021 B2 * | 10/2005 | Wakashiro | .......... F02N 11/0818 123/481 |
| 8,423,214 B2 * | 4/2013 | Kshatriya | .............. B60K 6/485 180/65.21 |
| 9,638,121 B2 | 5/2017 | Rayl | |
| 10,035,511 B2 | 7/2018 | Light-Holets et al. | |
| 10,060,368 B2 | 8/2018 | Pirjaberi et al. | |
| 2002/0115532 A1 * | 8/2002 | Wakashiro | ............ B60W 10/04 903/905 |
| 2002/0116112 A1 * | 8/2002 | Wakashiro | ............. B60K 6/485 903/905 |

(Continued)

FOREIGN PATENT DOCUMENTS

| | | |
|---|---|---|
| EP | 1 182 074 | 2/2002 |
| EP | 1 232 896 | 8/2002 |
| WO | WO-2017/127574 | 7/2017 |

*Primary Examiner* — Erick R Solis
(74) *Attorney, Agent, or Firm* — Foley & Lardner LLP

(57) ABSTRACT

Systems and methods for mitigating exhaust gas emissions via cylinder deactivation are provided. A system includes a controller coupled to an internal combustion engine and an electric motive device. The controller includes a processor and a memory coupled to the processor. The memory stores instruction that, when executed by the processor, cause the controller to: command the internal combustion engine to operate in a cylinder deactivation mode whereby at least one cylinder of a plurality of cylinders of the internal combustion engine is deactivated; receive a power request exceeding a current power output from the internal combustion engine; command the electric motive device to provide a supplemental power output based on the received power request; and, subsequent to commanding the electric motive device to provide the supplemental power out, activate the at least one cylinder of the plurality of cylinders of the internal combustion engine.

20 Claims, 6 Drawing Sheets

(56) References Cited

U.S. PATENT DOCUMENTS

| | | | |
|---|---|---|---|
| 2016/0201586 A1* | 7/2016 | Serrano | F02D 41/1498 701/111 |
| 2017/0342921 A1* | 11/2017 | Pirjaberi | F02D 41/1498 |
| 2020/0386176 A1 | 12/2020 | Pirjaberi et al. | |
| 2022/0120230 A1* | 4/2022 | Wilcutts | F02D 41/068 |

* cited by examiner

SYSTEMS AND METHODS TO MINIMIZE EMISSIONS SPIKES WHEN REACTIVATING OR DEACTIVATING A COMBUSTION CYLINDER

TECHNICAL FIELD

The present disclosure relates to systems and methods for minimizing emissions from an internal combustion engine. More particularly, the systems and methods of the present disclosure relate to utilizing an electric motive device, such as an electric motor or motor-generator, when reactivating or deactivating at least one cylinder of an internal combustion engine of a vehicle to minimize certain exhaust gas emissions.

BACKGROUND

Cylinder deactivation for a vehicle (e.g., cars and/or trucks) is an operating mode used to deactivate one or more cylinders (i.e., disable combustion in) of an engine of the vehicle while the engine is operating. While operating in the cylinder deactivation mode, the engine generally produces less power than when all of the engine's cylinders are utilized. For example, a truck may require the use of all cylinders when accelerating from a stop, but may need fewer cylinders when cruising at a constant or relatively constant speed on a highway. Cylinder deactivation operating mode is typically utilized to conserve fuel (e.g., during idle). However, the fuel conservation advantages may be offset with certain emissions characteristics of cylinder deactivation operating mode. For example, reactivating cylinders can produce nitrous oxide (NOx) spikes in systems with exhaust gas recirculation (EGR). Thus, cylinder deactivation may lead to certain benefits while also creating certain undesired consequences.

SUMMARY

One embodiment relates to a system. The system includes a controller coupled to an internal combustion engine and an electric motive device. The controller includes a processor and a memory coupled to the processor. The memory stores instruction that, when executed by the processor, cause the controller to: command the internal combustion engine to operate in a cylinder deactivation mode whereby at least on cylinder of a plurality of cylinder of the internal combustion engine is deactivated; receive a power request exceeding a current power output from the internal combustion engine; command the electric motive device to provide a supplemental power output based on the received power request; and subsequent to commanding the electric motive device to provide the supplemental power out, activate the at least one cylinder of the plurality of cylinders of the internal combustion engine.

In some embodiments, subsequent to commanding the electric motive device to provide the supplemental power output, the instructions, when executed by the processor, further cause the controller to implement a predefined time delay before activating the at least one cylinder of the plurality of cylinders of the internal combustion engine. In some embodiments, subsequent to commanding the electric motive device to provide the supplemental power output, the instructions, when executed by the processor, further cause the controller to cycle the at least one cylinder of the plurality of cylinders before activating the at least one cylinder of the plurality of cylinders of the internal combustion engine.

In some embodiments, the instructions, when executed by the processor, further cause the controller to monitor a content of the at least one cylinder of the plurality of cylinders before the at least one cylinder is deactivated, and the monitored content is stored in the memory of the controller. The monitored content may include an exhaust gas recirculation (EGR) value regarding EGR in the at least one deactivated cylinder and a previously commanded air-to-fuel ratio for the at least one cylinder before the at least one cylinder was deactivated. In some embodiments, the instructions, when executed by the processor, further cause the controller to compare the EGR value and the previously commanded AFR ratio to a predefined threshold, and based on the EGR value and the previously commanded AFR ratio exceeding the predefined threshold, the controller opens an exhaust valve of the at least one cylinder to empty at least a portion of the content of the at least one cylinder. In some embodiments, the instructions, when executed by the processor, further cause the controller to determine that the received power request relative to the current power output triggers reactivation of the at least one cylinder based on the received power request exceeding the current power output by more than a predefined amount and delaying reactivation of the at least one cylinder by commanding the electric motive device to provide the supplemental power output based on the received power request.

In some embodiments, the instructions, when executed by the processor, further cause the controller to cycle the at least one cylinder until a content of the at least one cylinder is determined to be within a predefined tolerance of a desired mixture. In some embodiments, the instructions, when executed by the processor, further cause the controller to deactivate the electric motive device after at least one cycle of the at least one deactivated cylinder. In some embodiments, the electric motive device is at least one of an electric motor or a motor-generator.

Another embodiment relates to a method for utilizing an electric motive device. The method includes: commanding, by a controller, an internal combustion engine to operate in a cylinder deactivation mode whereby at least one cylinder of a plurality of cylinders of the internal combustion engine is deactivated; receiving, by the controller, a power request exceeding a current power output from the internal combustion engine; commanding, by the controller, an electric motive device to provide a supplemental power output based on the received power request; and, subsequent to commanding the electric motive device to provide the supplemental power output, activating, by the controller, the at least one cylinder of the plurality of cylinders of the internal combustion engine.

In some embodiments, the method further includes monitoring, by the controller, a content of the at least one cylinder of the plurality of cylinders before the at least one cylinder is deactivated and storing, by the controller, the monitored content is stored in a memory of the controller. In some embodiments, monitoring the content includes monitoring an exhaust gas recirculation (EGR) value regarding EGR in the at least one deactivated cylinder and a previously commanded air-to-fuel (AFR) ratio for the at least one cylinder before that the at least one cylinder was deactivated. In some embodiments, the method further includes comparing, by the controller, the EGR value and the previously commanded AFR ratio to a predefined threshold and based on at least one of the EGR value or the previously commanded AFR ratio exceeding the predefined threshold, opening, by the controller, an exhaust valve of the at least one cylinder to empty at least a portion of the contents of the at least one cylinder. In some embodiments, the method further includes determining, by the controller, that the received power request relative to the current power output triggers reactivation of the at least one cylinder based on the received power request exceeding the current power output by more than a predefined amount and delaying reactivation of the at least one cylinder by commanding the electric motive device to provide a supplemental power output based on the received power request. In some embodiments, the method further includes cycling, by the controller, the at least one cylinder until a content of the at least one cylinder is determined to be within a predefined tolerance of a desired mixture. In some embodiments, the method further includes cycling, by the controller, the at least one of the deactivated cylinder a predetermined number of times prior to activating the at least one of the deactivated cylinder.

Another embodiment relates to a system. The system includes a controller coupled to an internal combustion engine and an electric motive device. The controller includes a processor and a memory coupled to the processor. The memory stores instructions that, when executed by the processor, cause the controller to: receive a power request lower than a current power output from the internal combustion engine; command the electric motive device to provide a supplemental power output based on the received power request; and, subsequent to commanding the electric motive device to provide the supplemental power output, deactivate an at least one cylinder of a plurality of cylinders of the internal combustion engine.

In some embodiments, the electric motive device is at least one of an electric motor or a motor-generator. In some embodiments, the instructions, when executed by the processor, further cause the controller to determine that the received power request relative to the current power output triggers deactivation of the at least one cylinder based on the received power request being lower than the current power output by more than a predefined amount and delaying deactivation of the at least one cylinder by commanding the electric motive device to provide the supplemental power output based on the received power request.

This summary is illustrative only and is not intended to be in any way limiting. These and other features, together with the organization and manner of operation thereof, will become apparent from the following detailed description when taken in conjunction with the accompanying drawings.

The described features, structures, advantages, and/or characteristics of the subject matter of the present disclosure may be combined in any suitable manner in one or more embodiments and/or implementations. In this regard, numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
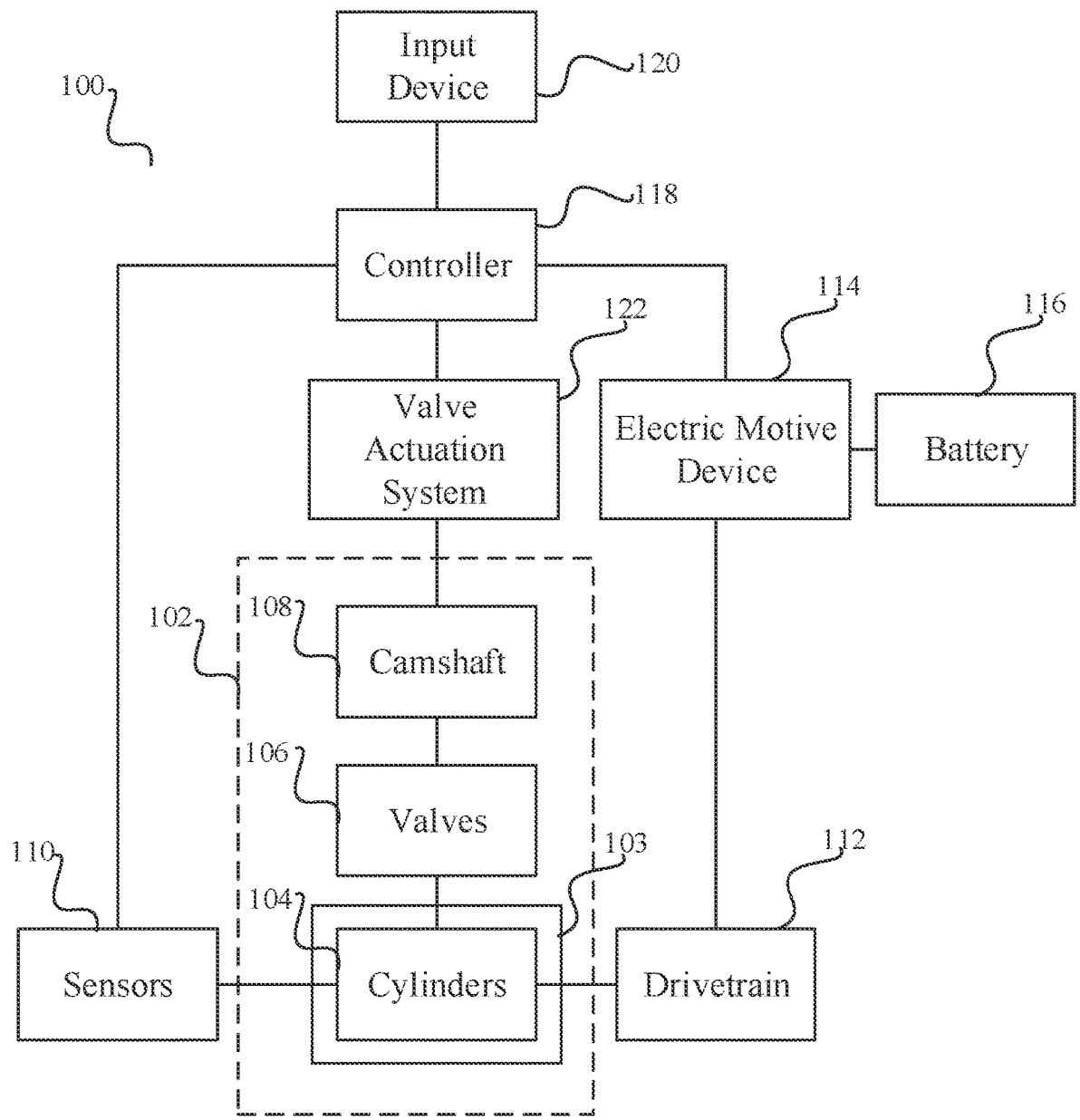
FIG. 1 is a schematic diagram of a vehicle system with a controller, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, the various embodiments disclosed herein relate to systems, apparatuses, and methods for utilizing an electric motive device, such as an electric motor, motor-generator, and the like, to supplement power during cylinder deactivation and cylinder reactivation when a vehicle receives a request (e.g., accelerator pedal input, brake pedal input, etc.) for an increase or a decrease in power output. Utilizing the electric motive device to supplement power during cylinder deactivation and cylinder reactivation may decrease certain emissions, such as $NO_X$ spikes and particulate matter (PM) spikes. Cylinder deactivation (CDA) mode is a broad term that encompasses various related but distinct cylinder deactivation operating modes. A first type of CDA operating mode is known as "fixed cylinder CDA." In fixed cylinder CDA operating mode, the same cylinder(s) are active/inactive each engine cycle during the fixed cylinder CDA operating mode. A second type of CDA operating mode is known as "skip-fire" operating mode. In skip-fire CDA mode, one or more cylinders are deactivated/inactive (e.g., combustion does not occur) on a cycle-by-cycle basis. Accordingly, a cylinder may be inactive for a first engine cycle and active for a second engine cycle. An "active" cylinder means that combustion is allowed to occur in that cylinder. An "inactive" or "deactivated" cylinder means that combustion is not allowed to occur in that cylinder. The present disclosure is applicable with each type of CDA operating mode, and the term CDA mode is meant to encompass all such operating modes unless indicated otherwise.

In operation and at the conclusion of CDA operating mode, reactivating one or more cylinders can lead to unwanted exhaust gas emissions due to the contents of the one or more cylinders upon reactivation. For example, a deactivated cylinder may have an undesired ratio of cylinder contents (e.g., air, fuel, recirculated exhaust gas, etc.) when commanded for combustion (reactivation) that may result in $NO_X$ spikes and PM spikes (i.e., $NO_X$ or PM emissions above a predefined threshold). Wherein the predefined $NO_X$ spikes and PM spikes may adversely result in a difficulty in complying with various emissions regulations. As described herein, a controller commands an electric motive device to provide or supplement the power provided by the engine system to accommodate the request for increased power during reactivation, such that the deactivated cylinder(s) is not immediately reactivated (i.e., reactivation of the one or more inactive cylinders is time delayed). In operation and when a reactivation command is received, the controller may open an exhaust valve of the deactivated cylinder(s) to allow at least some of the contents of the cylinder to be exhaled to an exhaust gas conduit. As another example, the controller may determine or estimate the contents of the deactivated cylinder(s). In each situation, the controller may then determine a desired charge for the cylinder(s) for reactivation (e.g., intake air and/or intake air and fuel) to enable a desired combustion condition (e.g., rich, lean, stoichiometric). During this time, the controller may command the electric motive device to provide the additional power requested by the operator while the contents of the to-be-activated cylinder(s) are adjusted such that power requirements for the vehicle are met or likely met. When the contents of the to-be-activated cylinder(s) meet or likely meet a desired composition (i.e., mixture), combustion is enabled in the to-be-activated cylinder(s) by the controller. In some embodiments, the contents may include a desired charge composition and/or the cylinder having a pressure at or above a predefined pressure threshold. Information regarding the contents of the cylinder may be determined by a plurality of sensors that directly measure the contents of the cylinder, or may be estimated based on sensors located proximate the cylinders (e.g., upstream and/or downstream of the cylinders). In some embodiments and as described herein, the electric motive device may be utilized during cylinder deactivation, such as when the engine system receives a request for decreased power. With respect to deactivation or reactivation, the controller may command the electric motive device to supplement engine power while one or more cylinders are cycled until the one or more cylinders have the desired cylinder contents. Without waiting for a desired composition of the contents of the cylinders (which may be a balance with the current active cylinders), the currently commanded charge (e.g., air, fuel injection, etc.) may not result in a complete or near complete combustion of the to-be-activated cylinders. For example, during CDA, the contents of deactivated cylinders may decrease in temperature, congregate in unwanted portions of the cylinder, and so on, all of which may lead to incomplete or nearly incomplete combustion characteristics. As a result, increased amounts of $NO_X$, PM, and other undesired exhaust gas emissions characteristics may occur. However, by waiting to cause combustion when the contents are at a desired composition, these emissions "spikes" may be mitigated.

As used herein, the phrases "typical operating pattern" or "normal operating pattern" as used with respect to describing operation of valves refers to standard valve timing in an internal combustion engine. For example, during an intake stroke, the intake valve is open to allow for the cylinder to draw in contents and the exhaust valve is closed to prevent the same contents or trapped contents from escaping and to prevent drawing in exhaust gas. A valve operating "outside of the typical operating pattern" refers to a valve being open or closed outside of standard valve timing. For example, an exhaust valve would be operating outside of the typical operating pattern if it were open during an intake stroke of a cylinder.

As used herein, the term "cycling" or "cycle" as used with respect to describing operation of a deactivated cylinder (i.e., cycling a cylinder) refers to operating the engine and particularly the cylinder without combustion (e.g., no spark ignition or compression ignition) through a full set of repeatable operations for the deactivated cylinder (e.g., a single occurrence of each stroke of the cylinder). Operation of the deactivated cylinder may include an exhaust stroke, wherein the contents of the cylinder are evacuated through an open exhaust valve by a piston pushing out the cylinder contents, and an intake stroke, where the piston pulls in contents through an open intake valve. Power and compression strokes may also occur. However and as used herein, the cycle of a deactivated cylinder refers to a cylinder experiencing an exhaust and an intake stroke and any other strokes without combustion occurring. Thus, power and compression strokes may occur during the cycle, but combustion is prevented while the cylinder is deactivated (e.g., no fuel injection during compression in a compression-ignition engine, no spark in a spark-ignited engine). Accordingly and for a four-stroke engine, a cycle of a deactivated cylinder includes the four-strokes occurring in the cylinder but combustion not happening. The cycle may be different for different engine types (e.g., a four-stroke engine cycle may differ from a two-stroke engine cycle). The controller as described herein may count/track the number of cycles of the deactivated cylinder. In some embodiments, cycling a cylinder may include operating an intake valve and/or an exhaust valve of the deactivated cylinder according to a typical operating pattern (e.g., intake valve is open and exhaust valve is closed during intake stroke, etc.). Alternatively, cycling a cylinder may include a controller commanding a valve actuation system, both described herein, to operate the intake valve and/or the exhaust valve of the deactivated cylinder outside of typical operating patterns (e.g., intake valve is open during exhaust stroke, etc.).

Referring now to FIG. 1, a schematic diagram of a vehicle with a system 100 is shown, according to an exemplary embodiment. The system 100 may be included in an on-road or an off-road vehicle including, but not limited to, line-haul trucks, mid-range trucks (e.g., pick-up trucks), tanks, airplanes, locomotives, various types of industrial equipment (excavators, backhoes, tractors, mowers, etc.), etc. The system 100 could also be a part of a stationary system (e.g., generator, certain factory machinery, etc.). The system 100 includes an engine system 102 having an engine 103 with at least one cylinder 104, at least one valve 106, and at least one camshaft 108, at least one sensor 110, a drivetrain 112 coupled to the engine system 102, an electric motive device 114 coupled to the drivetrain 112, a battery 116 coupled to the electric motive device 114, an input device 120, a valve actuation system 122, and a controller 118 coupled to each of the aforementioned components/systems. It should be understood that the vehicle may include additional components/systems than those depicted and described herein.

In some embodiments, the engine 103 is a compression engine (e.g., engine operating on the diesel cycle) using fuel configured for compression engines (e.g., diesel fuel, biodiesel, etc.). In some other embodiments, the engine 103 is a spark-ignition engine (e.g., engine employing a spark plug to produce ignition) using fuel configured for spark-ignition engines (e.g., gasoline, etc.). In various alternate embodiments, the engine 103 may have other structures or be a part of other engine systems. For example, the engine 103 may be a hybrid engine, which may include both an electric motor or motor(s) and an internal combustion engine that function to provide power to propel the vehicle. A hybrid vehicle can have various configurations. For example, in a parallel configuration, both the electric motor and the internal combustion engine are operably connected to the drivetrain 112 to propel the vehicle. In a series configuration, the electric motor is operably connected to the drivetrain 112 and the internal combustion engine indirectly powers the drivetrain 112 by powering the electric motor (examples include extended range electric vehicles or range-extended electric vehicles). In the example depicted, the engine 103 is a compression-ignition powered by diesel fuel.

The system 100 may also include an exhaust aftertreatment system. The exhaust aftertreatment system may be coupled to the engine 103 and structured to treat exhaust gases from the engine 103 in order to reduce the emissions of harmful or potentially harmful elements (e.g., $NO_X$ emissions, CO emissions, PM emissions, etc.). The aftertreatment system may include various components and system, such as a particulate filter and a selective catalytic reduction (SCR) system. A selective catalytic reduction system can convert nitrogen oxides present in the exhaust gases produced by the engine into diatomic nitrogen and water through oxidation within a catalyst. A particulate filter may be configured to remove particulate matter, such as soot, from exhaust gas flowing in an exhaust gas conduit system.

The SCR catalyst operation can be affected by several factors. For example, the effectiveness of the SCR catalyst to reduce the NOx in the exhaust gas can be affected by the operating temperature. If the temperature of the SCR catalyst is below a threshold value or range, the effectiveness of the SCR catalyst in reducing NOx may be reduced below a desired threshold level, thereby increasing the risk of high NOx emissions into the environment. The SCR catalyst temperature can be below the threshold temperature under several conditions, such as, for example, during and immediately after engine startup, during cold environmental conditions, etc. Further, typically, higher combustion temperatures promote engine out NOx (EONOx) production. This is due to the rapid fire expansion from within the cylinder, which leads to the release of NOx. Increasing EGR leads to reduction in combustion temperatures, which reduces EONOx. However, EGR can promote particulate matter emissions due to incomplete combustion of particles. Additionally, higher loads and power demands also tend to increase combustion temperatures and, in turn, EONOx. Higher power output coincides with higher fueling pressures and quantity (increases in fuel rail pressure). In turn, increasing fueling pressures, quantity, etc. also tends to promote EONOx production.

The aftertreatment system may further include a reductant delivery system which may utilize a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. Reductant is added to the exhaust gas stream to aid in the catalytic reduction. The reductant may be injected by an injector upstream of the SCR catalyst member such that the SCR catalyst member receives a mixture of the reductant and exhaust gas. The reductant droplets undergo the processes of evaporation, thermolysis, and hydrolysis to form non-$NO_x$ emissions (e.g., gaseous ammonia, etc.) within the decomposition chamber, the SCR catalyst member, and/or the exhaust gas conduit system, which leaves the aftertreatment system. The aftertreatment system may further include an oxidation catalyst (DOC) fluidly coupled to the exhaust gas conduit system to oxidize hydrocarbons and carbon monoxide in the exhaust gas. In order to properly assist in this reduction, the DOC may be required to be at a certain operating temperature. In some embodiments, this certain operating temperature is between approximately 200 degrees C. and 500 degrees C. In other embodiments, the certain operating temperature is the temperature at which the conversion efficiency of the DOC exceeds a predefined threshold value.

The aftertreatment system may further include a Lean NOx Trap (LNT) and/or a three-way catalyst (TWC) (or another catalytic converter). The LNT may act to reduce NOx emissions from a lean burn internal combustion engine by means of adsorption. Among other potential functions and features, the TWC may function to manage emissions from rich-burn engines while providing optimal performance with minimal cleaning or maintenance. Utilizing a flow-through substrate coated with a precious metal catalyst, the chemical oxidation process may convert engine out emissions into harmless nitrogen, carbon dioxide and water vapor as the gas passes through the catalytic converter (e.g., three-way catalyst).

The engine 103 includes a plurality of cylinders 104. The size/displacement of the engine 103 may vary based on application (e.g., 1 L to 120 L, etc.). The orientation of the cylinders 104 may vary based on structure of the engine 103 as well (e.g., V6-style engine, V8, include, etc.). Further, there may be any number of cylinders 104 arranged in any engine orientation (e.g., in a V-shape, in a W-shape, inline, etc.). For example, there may be six cylinders 104 oriented in a V-configuration (e.g., two rows of three cylinders 104). In some embodiments, such as when the engine 103 is a spark-ignition engine, the engine 103 may include a spark plug. The spark plug may be a device capable for ignition the contents of the combustion chamber (e.g., electric current spark ignition plug, flame igniters, etc.). During CDA mode, the spark plug may be deactivated in the cylinders that are deactivated.

The engine system 102 further includes valves 106 that are coupled to the engine 103. The valves 106 are configured to facilitate an intake of air or a charge into the cylinders 104 and an exhaust of exhaust gases from the cylinders 104. Each cylinder 104 includes at least two valves 106, an intake valve and an exhaust valve. Opening the intake valve enables the associated cylinder 104 to be in fluid communication with an engine's intake system (e.g., carburetor, fuel injector, etc.). The intake valve facilitates the input of constituents required for combustion (e.g., fuel, oxidant, etc.). For example, the intake valve allows air, recirculated exhaust gas, and fuel into the combustion chamber. Opening the exhaust valve enables the associated cylinder 104 to be in fluid communication with the engine exhaust aftertreatment system (e.g., filters, catalytic converter, exhaust recirculation system, etc.). The exhaust valve facilitates output of at least a portion of contained cylinder contents. The exhaust valve may exhaust cylinder contents after combustion, or may exhaust cylinder contents prior to combustion. In some embodiments and in the example shown as described above where the engine 103 is a compression-ignition engine, the cylinder 104 includes a fuel injector configured to inject fuel directly into the combustion chamber. As described herein, the controller 118 may selectively open, partially open, and/or close the intake and/or exhaust valves in order to refresh the contents of the deactivated cylinder until the contents are within a desired tolerance or range (e.g., by monitoring an intake air amount and/or EGR amount to the cylinder while the intake valve is open and allowing some contents to escape via opening of the exhaust valve until the intake air and/or EGR amount are within a desired range).

The engine system includes a camshaft 108 coupled to the engine 103. In particular, the camshaft 108 is operably coupled to the valves 106. The engine system may include a plurality of camshafts 108, in some embodiments. For example, when the cylinders 104 are oriented in a V-configuration (e.g., two rows of cylinders 104), the engine system 102 may include a camshaft 108 on each row of cylinders 104. In some embodiments, the plurality of camshafts 108 may be configured to independently control different portions of a system 100. The camshaft 108 includes a plurality of cams (not shown), each cam corresponding to a valve 106. When the camshaft 108 rotates, the cams open and close the corresponding valves 106. In some embodiments, the valves 106 may include a device configured to keep the valve 106 in an open position or a closed position, regardless of the camshaft 108 position. During CDA mode (such as a dynamic skip fire operating mode), the valves 106 associated with one or more of the cylinders 104 are commanded (by the controller 118) into a closed position. As a result, intake and exhaust is prevented or substantially prevented from those one or more cylinders (i.e., the one or more cylinders are deactivated).

As described herein, the controller 118 may monitor operation of the system 100 via one or more sensors 110. The sensors 110 are configured to detect operation characteristics (e.g., temperature, pressure, contents, etc.) of certain components of FIG. 1, such as the cylinder 104, the valve 106, the drivetrain 112, the electric motive device 114, and so on. The number, placement, and type of sensors included in the system 100 is highly configurable. The sensors 110 may include, but are not limited to, one or more of an oxygen sensor, NOx sensor, PM sensor, mass-air-flow sensor, intake manifold sensor, exhaust manifold pressure sensor, a fluid sensor (e.g., exhaust gas flow rate, coolant flow rate, etc.), a pressure sensor (e.g., tire pressure, cylinder pressure, etc.), and so on.

The sensors 110 may be located within or proximate to one or more cylinders of the cylinders 104. In some embodiments, only certain cylinders 104 may include a sensor 110. In some embodiments, the sensors 110 may be included in intake and exhaust channels leading to and away from the cylinders 104, respectively. Accordingly, one or more sensors 110 may be configured to detect or otherwise acquire information regarding a makeup of the contents of the cylinder 104. For example, an oxygen sensor may be disposed upstream of the cylinder and configured to determine an oxygen content of charge air entering the cylinder 104. Based on the fuel injected for the cylinder, the controller 118 may determine or estimate an air-to-fuel ratio for the cylinder (or, an oxygen content based on the readings/data/ information from the oxygen sensor). As another example, a mass flow sensor may be disposed upstream of the cylinder and configured to determine a flow rate of exhaust gas into the cylinder 104. Based on the flow rate over a predefined unit of time, the controller 118 may determine an amount of EGR provided to the cylinder for a period of time (via an integration process using the flow rate over a predefined amount of time). A pressure sensor may be disposed proximate to one or more fuel injectors and configured to acquire information regarding a fuel pressure (or, with systems with a common rail, a pressure of the common rail). Thus, the one or more of the sensors 110 may be located upstream (e.g., in the intake) and/or downstream (e.g., in the exhaust) of the cylinder 104. In some embodiments, a cylinder 104 may include a plurality of sensors 110 each configured to detect different contents of the cylinder 104. In some embodiments, each individual sensor 110 is configured detect multiple types of cylinder contents. In some embodiments, the sensors 110 directly measure the contents of the cylinder 104. For example, a sensor 110 may be configured in the cylinder 104 to measure the makeup of the charge within the cylinder 104. While the description is primarily directed to a single cylinder 104 herein, it should be understood that the principles and features may be applied across some or all of the cylinders of the engine.

Cylinder 104 contents may be determined by the controller 118 after receiving signals, information, data, etc. from the at least one sensor 110. The controller 118 may compare the sensor 110 signals to a lookup table stored in a memory of the controller 118. For example, a sensor 110 may detect a specific temperature of intake air, and in response, the controller 118 may then compare the temperature as detected by the sensor 110 and determine the density of the air corresponding to that temperature. The controller 118 may also use one or more algorithms, formulas, models, etc. to determine the cylinder contents. For example, to determine an EGR fraction, the controller 118 may receive signals from one or more sensors 110 that detect mass-flow-rate of intake air and mass-flow-rate of intake EGR into the cylinder 104 for a period immediately preceding the cylinder 104 deactivation (e.g., the cycle before the cylinder 104 was deactivated). The controller 118 may then use an algorithm to calculate the EGR fraction estimated to be trapped/stored in the cylinder 104 during deactivation based on these flow rates.

The sensors 110 may also include sensors to detect information regarding emitted exhaust gas from the engine 103. The sensors may be NOx sensors, temperature sensors, particulate matter (PM) sensors, and/or other emissions-related sensors. The NOx sensors are structured to acquire data indicative of a NOx amount at each location that the NOx sensor is located (e.g., a concentration amount, such as parts per million). The NOx sensor may also measure or acquire data indicative of an oxygen concentration in the exhaust gas flowing by the sensor. The temperature sensors are structured to acquire data indicative of a temperature at their locations. The PM sensors are structured to monitor particulate matter flowing through the aftertreatment system. In one embodiment, the sensors are structured as exhaust gas constituent sensors (e.g., CO, NOx, PM, SOx, etc. sensors). In another embodiment, certain of the sensors 110 are structured as non-exhaust gas constituent sensors that are used to estimate exhaust gas emissions (e.g., temperature, flow rate, etc.).

Additional sensors may be also included with the vehicle. The sensors may include engine-related sensors (e.g., torque sensors, speed sensors, pressure sensors, flow rate sensors, temperature sensors, etc.). The sensors may further include electric motive device-related sensors (e.g., a battery state of charge (SOC) sensor, a power output sensor, a voltage sensor, a current sensor, etc.). The additional sensors may still further include sensors associated with other components of the vehicle (e.g., speed sensor of a turbo charger, fuel quantity and injection rate sensor, fuel rail pressure sensor, etc.).

The sensors may be real or virtual (i.e., a non-physical sensor that is structured as program logic in the controller 118 that makes various estimations or determinations based on received data). For example, an engine speed sensor may be a real or virtual sensor arranged to measure or otherwise acquire data, values, or information indicative of a speed of the engine 103 (typically expressed in revolutions-per-minute). The sensor is coupled to the engine (when structured as a real sensor), and is structured to send a signal to the controller 118 indicative of the speed of the engine 103. When structured as a virtual sensor, at least one input may be used by the controller 118 in an algorithm, model, look-up table, etc. to determine or estimate a parameter of the engine (e.g., power output, etc.). The other sensors may be real or virtual as well. As described herein, the sensors 110 and additional sensors may provide data regarding how the particular vehicle system is operating, and determine how to adjust operating points of the engine and/or motor/generator based on the sensor feedback.

The system 100 includes a drivetrain 112. The drivetrain 112 is coupled to the engine 103. The drivetrain 112 may include a transmission coupled to the engine 103, a final drive coupled to the transmission, and any other components of a drivetrain. When combustion occurs within the cylinders 104, the drivetrain 112 receives the energy released by the combustion (in the form of a rotating crankshaft) and converts the rotating crankshaft into mechanical energy for rotating a driveshaft (not shown). The drivetrain 112 provides the final drive power to an end component/system (e.g., power the wheels, another motive device, such as tracks, or a power receiving device if, for example, embodied in a stationary piece of equipment such as a generator or genset). In the example shown, the system 100 is included in a vehicle such that power is provided to wheels to move the vehicle. The drivetrain 112 may include sensors (virtual or real) that provide information or data regarding operation of the drivetrain 112. For example, the sensors 110 may provide the rotational speed of the wheels.

The system 100 includes an electric motive device 114 (also referred to as an electric machine herein). The electric motive device 114 is operably coupled to the drivetrain 112. The electric motive device 114 may be an electric motor, a motor-generator, an alternator, or another electric power device. The electric motive device 114 includes a motor portion configured to produce mechanical energy. In some embodiments, such as when the electric motive device 114 is a motor-generator, the electric motive device 114 includes a distinct motor and a distinct generator, coupled together. The motor coils of the distinct motor and generator coils of the distinct generator may be wound around a single rotor, or may be wound around separate rotors.

The electric motive device 114 is electrically coupled to a battery 116. The battery 116 is a power source (e.g., lead-acid, Li-Ion, Li-Po, etc.) configured to provide the electric motive device 114 with electrical power. In some embodiments, the battery 116 is the main vehicle battery (e.g., used for starting the engine, used for operating certain vehicle systems/components when the engine is not operating, etc.). In some embodiments, such as when the electric motive device 114 includes a generator portion, the generator portion of the electric motive device 114 may be configured to provide the battery 116 with electric power, which the battery 116 may then store. The electric motive device 114 converts the electrical power provided by the battery 116 into mechanical energy (e.g., rotational energy) in the drivetrain 112, providing the drivetrain 112 with supplemental power. It should be understood that other power providing devices for the electric motive device 114 are contemplated herein (e.g., ultra-capacitors, etc.).

In the example shown, the electric motive device 114 is coupled to the drivetrain 112 and selectively drives or rotates the driveshaft to, for example, propel the vehicle embodying the system 100. The electric motive device 114 may be operated at various levels and loads/power outputs (e.g., 0%, 10%, 20%, 50%, 70%, 100%, etc.) of the maximum rated load of the electric motive device 114.

As also shown, an input device 120 is included in the system 100. The input device 120 is coupled to the controller 118, and in turn, may exchange signals, information, etc. with the controller 118. For example, the input device 120 may provide an indication regarding a change in power requested from the system 100. The input device 120 may be vehicle control devices, such as an accelerator pedal, a transmission shifter, a brake pedal, transmission paddle shifter, etc. The input device 120 may also be a circuit configured to send power requirement signals to the controller 118. The input device 120 may include a steering wheel, a joystick, a brake pedal, an accelerator pedal, etc. For example, when the accelerator pedal is pressed, the controller 118 may interpret this position as a request for an increase in power.

A valve actuation system 122 is included in the system 100. The valve actuation system is coupled to the controller 118. The valve actuation system 122 also coupled to the camshaft 108. The valve actuation system 122 is configured to rotate the camshaft 108 responsive to signals, commands, etc. from the controller 118. The valve actuation system 122 may be coupled directly to the valves 106, such that the valves may be operated (opened or closed) without the camshaft 108. In some embodiments, the valve actuation system 122, based on one or more commands or instructions from the controller 118, may operate the intake valve and/or exhaust valve of at least one cylinder 104 outside of a typical operating pattern (e.g., the intake valve is open during the exhaust stroke of the cylinder 104).

As also shown, the system 100 includes a controller 118. The controller 118 is structured to control, or at least partly, operation of the electric motive device 114 and the valve actuation system 122, the sensors 110, engine 103, and the input device 120. Communication between and among the components may be via any number of wired and/or wireless connections. For example, a wired connection may include a serial cable, a fiber optic cable, a CAT5 cable, or any other form of fired connection. A wireless connection may include the Internet, Wi-Fi, cellular, radio, etc. In one embodiment, a controller area network ("CAN") bus provides the exchange of signals, information, and/or data. The CAN bus includes any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Thus, the controller 118 may receive and use various data, where the data may include EGR fraction data (e.g., EGR fraction or estimated amount within at least one cylinder 104), air-to-fuel ratio data (e.g., air-to-fuel ratio or estimated ratio within at least one cylinder 104), temperature data (e.g., temperature inside an intake channel leading to at least one cylinder 104, an estimated temperature within at least one cylinder 104), vehicle operating data (e.g., accelerator pedal position, brake pedal position, transmission setting, a requested torque, an engine speed, vehicle speed, engine temperature, etc.), and so one where the data may receive via one or more sensors 110 and/or determined by the controller 118 based on information received from the sensors, and so on. The structure and function of the controller 118 are further described in regard to FIG. 2

Figure 2:
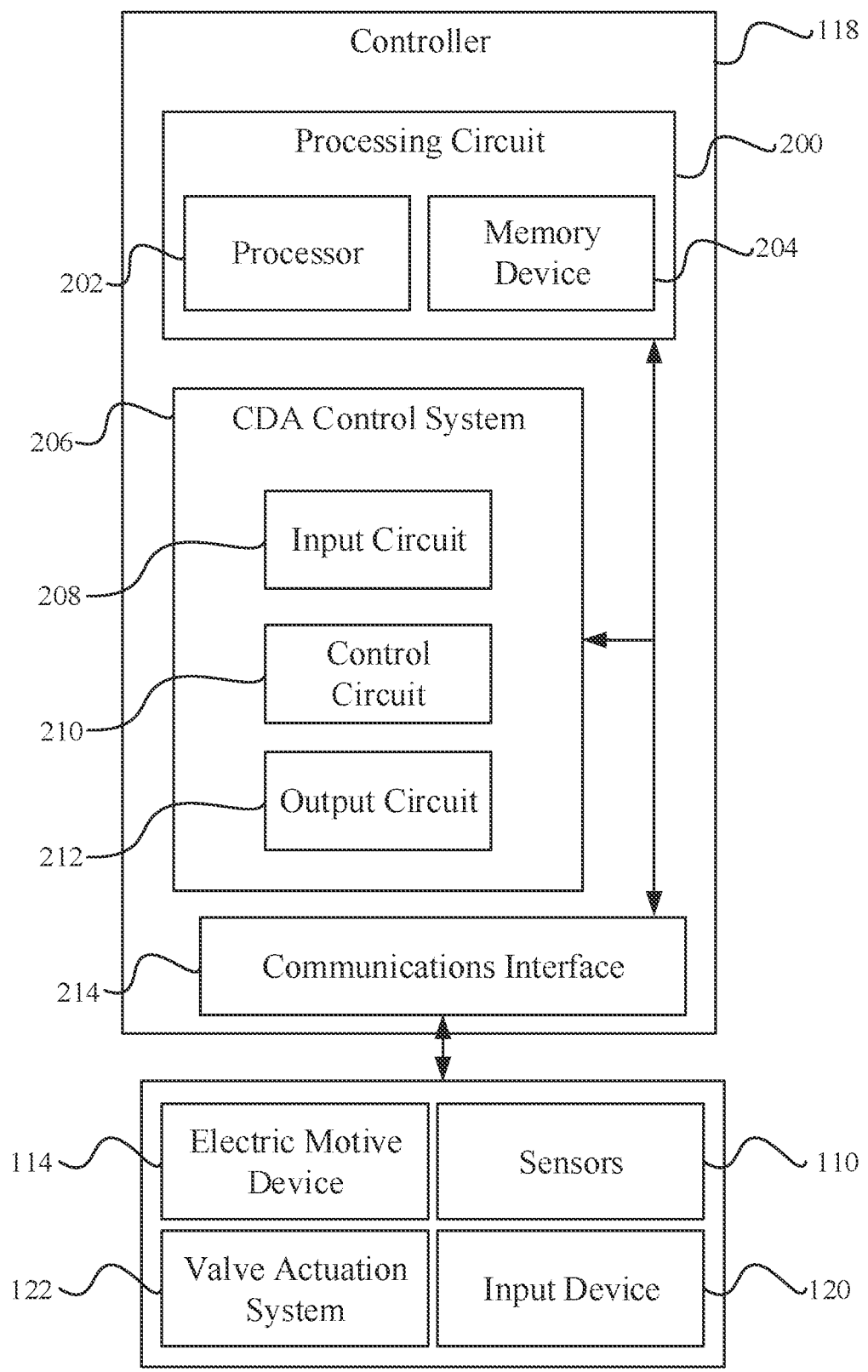
FIG. 2 is a schematic diagram of the controller of FIG. 1, according to an exemplary embodiment.

Referring now to FIG. 2, a schematic diagram of the controller 118 of FIG. 1 is shown, according to an exemplary embodiment. The controller 118 is structured to receive inputs (e.g., signals, information, data, etc.) from one or more components of system 100, such as the sensors 110 or the input device 120. The controller 118 is also structured to send commands, instructions, etc. to one or more components of the system 100. Thus, the controller 118 is structured to control, at least partly, the electric motive device 114, the engine 103, and the valve actuation system 122. As the components of the FIG. 2 can be embodied in a vehicle, the controller 118 may be structured as one or more electronic control units (ECU). The controller may be separate from or included with at least one of a transmission control unit, an exhaust aftertreatment control unit, a powertrain control module, and engine control module, etc.

In operation, the controller 118 is configured to determine activate/deactivate the electric motive device and operate the electric motive device 114 to supplement an engine power output during cylinder deactivation or reactivation as part of the CDA mode to prevent or reduce certain undesired emissions characteristics (e.g., NOx spikes and PM spikes). Utilization of the electric motive device 114 allows a supplemental amount of power to be provided to, for example, the drivetrain 112 until one or more of the deactivated cylinders 104 are reactivated to minimize NOx spikes and without PM spikes. In operation and as described herein, when the controller 118 receives an input, such as a power request, from the input device 120, the controller 118 then determines the supplemental power required or likely required by the electric motive device 114 to fulfill the power request relative to a current power output from the engine 103. The controller 118 may analyze data from a sensor 110 to determine the cylinder contents of one or more deactivated cylinders 104. The controller 118 may compare the cylinder contents to a predefined threshold and, particularly, a predefined tolerance or range regarding the contents of the cylinder for reactivation. If the cylinder contents of the cylinder 104 are outside the tolerance or range, the controller 118 sends a signal to the valve actuation system 122 to cycle the cylinders 104, without commanding combustion, until the contents of the cylinder 104 are within the predefined tolerance or range amounts. In some embodiments, the valve actuation system 122 cycles the cylinders 104 according to a typical operating pattern. Alternatively, the controller 118 commands the valve actuation system 122 to operate the valves 106 of the cylinder 104 outside of the typical operating pattern during cylinder 104 to refresh the contents of the cylinder to reach or obtain a predefined tolerance or range amount of certain cylinder contents faster than when the valves 106 operate according to the typical operating pattern. If the cylinder contents are within the predefined tolerance or range amounts, then the controller 118 reactivates the one or more cylinders 104 (i.e., causes combustion to occur in these cylinders). In some embodiments, each cylinder 104 is reactivated independently of the other cylinders 104.

The controller 118 is shown to include a processing circuit 200 having a processor 202 and a memory device 204, a CDA control system 206 having an input circuit 208, a control circuit 210, and an output circuit 212, and a communications interface 214.

The communications interface 214 is structured to enable the controller 118 to communicate with system 100 components such as the electric motive device 114, the sensors 110, the valve actuation system 122, and the input device 120. The communications interface 214 may include any combination of wired and/or wireless interfaces (e.g., jacks, antennas, transmitters, receivers, transceivers, wire terminals, etc.) for conducting data communications with these various systems, devices, or networks to enable in-vehicle communications (e.g., between and among the components of the vehicle) and, in some embodiments, out-of-vehicle communications (e.g., with a remote server). For example and regarding out-of-vehicle/system communications, the communications interface 214 may include an Ethernet card and port for sending and receiving data via an Ethernet-based communications network and/or a Wi-Fi transceiver for communicating via a wireless communications network. In some embodiments, a telematics device may be included with the vehicle that enables out-of-vehicle communications. The communications interface 214 may be structured to communicate via local area networks or wide area networks (e.g., the Internet) and may use a variety of communications protocols (e.g., IP, LON, Bluetooth, ZigBee, radio, cellular, near field communication).

In one configuration, the input circuit 208, the control circuit 210, and the output circuit 212 are embodied as machine or computer-readable media storing instructions that are executable by a processor, such as processor 202 and stored in a memory device, such as memory device 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming language, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 208, the control circuit 210, and the output circuit 212 are embodied as hardware units, such as electronic control units. As such, the input circuit 208, the control circuit 210, and the output circuit 212 may be embodied as one or more circuitry components including, but not limited to, processing circuitry, network interfaces, peripheral devices, input devices, output device, sensors, etc. In some embodiments, the input circuit 208, the control circuit 210, and the output circuit 212 may take the form of one or more analog circuit, electronic circuit (e.g., integrated circuits (IC), discrete circuits, system on a chip (SOCs) circuits, microcontrollers, etc.), telecommunication circuits, hybrid circuits, and any other type of "circuit." In this regard, the input circuit 208, the control circuit 210, and the output circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. The input circuit 208, the control circuit 210, and the output circuit 212 may also include programmable hardware devices such as field programmable gate arrays, programmable array logic, programmable logic devices or the like. The input circuit 208, the control circuit 210, and the output circuit 212 may include one or more memory device for storing instructions that are executable by the processor(s) of the input circuit 208, the control circuit 210, and the output circuit 212. The one or more memory device and processor(s) may have the same definition as provided below with respect to memory device 204 and processor 202. In some hardware unit configurations, the input circuit 208, the control circuit 210, and the output circuit 212 may be geographically dispersed throughout separate locations in, for example, a vehicle. Alternatively and as shown, the input circuit 208, the control circuit 210, and the output circuit 212 may be embodied in or within a single unit/housing, which is shown as the controller 118.

In the example shown, the controller 118 includes the processing circuit 200 having the processor 202 and the memory device 204. The processing circuit 200 may be structured or configured to execute or implement the instructions, commands, and/or control processes described herein with respect to the input circuit 208, the control circuit 210, and the output circuit 212. The depicted configuration represents the input circuit 208, the control circuit 210, and the output circuit 212 as machine or computer-readable media storing instructions that may be stored by the memory device. However, as mentioned above, this illustration is not meant to be limiting as the present disclosure contemplates other embodiments where the input circuit 208, the control circuit 210, and the output circuit 212, or at least one circuit of the input circuit 208, the control circuit 210, and the output circuit 212, is configured as a hardware unit. All such combinations and variations are intended to fall within the scope of the present disclosure.

The processor 202 may be a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof, and the like. In this regard, a processor may be a microprocessor, or, any conventional processor, or state machine. A processor also may be implemented as a combination of computer devices, such as a combination of a DSP and a microprocessor, a plurality of microprocessors, one or more microprocessors in conjunction with a DSP core, or any other such configuration. In some embodiments, the processor 202 may be shared by multiple circuits (e.g., the input circuit 208, the control circuit 210, and the output circuit 212 may comprise or otherwise share the same processor that, in some example embodiments, may execute instructions stored, or otherwise accessed, via different areas of memory). Alternatively or additionally, the one or more processors may be structure to perform or otherwise execute certain operations independent of one or more coprocessors. In other example embodiments, two or more processors may be coupled via a bus to enable independent, parallel, pipelined, or multi-threaded instruction execution. All such variations are intended to fall within the scope of the present disclosure.

The memory device 204 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 204 may be coupled to the processor 202 to provide computer code or instructions to the processor 202 for executing at least some of the processes described herein. Moreover, the memory device 204 may be or include tangible, non-transient volatile memory or non-volatile memory. Accordingly, the memory device 204 may include database components, object code components, script components, or any other type of information structure for supporting the various activities and information structures described herein.

The CDA control system 206 is structured to receive information from the sensors 110 through the input circuit 208. In particular, the input circuit 208 is structured to receive information from the sensors 110 via the communications interface 214. The input circuit 208 may also receive data (e.g., power request commands) from the input device 120 (e.g., depression of the accelerator pedal, release of the accelerator pedal, indications of transmission shift events, etc.). The input circuit 208 may modify or format the received information (e.g., via an analog/digital converter, etc.) so that the information can be readily used by the control circuit 210 or another circuit (e.g., the output circuit 212).

Based on the received information, the control circuit 210 of the CDA control system 206 is structured to monitor the system 100 and determine one or more control operating parameters for the electric motive device 114, engine 103, valve actuation system 122, and various other components or systems. The output circuit 212 is structured to send the control operating parameters to the electric motive device 114 and the valve actuation system 122. The output circuit 212 may modify or format the information prior to sending (e.g., via an analog/digital converter, etc.) so that information can be readily used by the electric motive device 114 and the valve actuation system (and/or other systems, components, etc.).

The CDA control system 206 is structured to implement a CDA operating mode with the engine. The CDA control system 206 is configured to control activation and deactivation of the cylinders 104 of the engine 103. The CDA control system 206 is also structured to implement various CDA operating modes, such as dynamic skip-fire operating mode. The CDA control system 206 may also determine the power provided by the active cylinders 104 to the drivetrain 112 during the CDA operating mode. For example, a sensor 110 may monitor the power output and send the power output data to the controller 118. As another example, the CDA control system 206 may correlate fueling commands (e.g., quantity, timing, etc.) to an approximate power output for the engine (i.e., the active cylinders). Based on received information, the CDA control system 206 may determine a maximum or approximate maximum power output that the number of activated cylinders 104 can produce without activation of additional cylinders. The maximum power output may be a predefined value that is specific to the number of active cylinders and potentially other factors. For example, the CDA control system 206 may determine that four of six cylinders 104 are active in an engine 103 and, as such, the CDA control system 206 may then determine that the engine 103 may produce Y HP maximum power corresponding to four active cylinders. In another embodiment, the CDA control system 206 may determine a maximum power output for the number of active cylinders by the control circuit 210 accessing a lookup-table, using an algorithm, a model, etc. The operating mode as well as any associated information (e.g., power output, maximum power output, etc.) may be stored and accessed in the memory device 204.

The CDA control system 206 is structured to receive a power request from the input device 120. The control circuit 210 compares the power request to the current power output of the engine 103 to determine how much supplemental power is needed. For example, if the current power output is 10 units of power and the power request is for approximately 13 units of power, the control circuit 210 determines that 3 units of power are needed. The control circuit 210 determines if the current number of activated cylinders can provide the supplemental power, such as when the power request is at or below the maximum power threshold, or if the electric motive device 114 can provide the supplemental power.

If the control circuit 210 determines the electric motive device 114 can provide the supplemental power, the CDA control system 206 is structured to send a command (e.g., an electric signal) to the electric motive device 114. In one embodiment, the electric motive device 114 is deactivate so the control circuit 210 activates the electric motive device 114. In another embodiment, the electric motive device 114 is already active so the control circuit 210 commands the electric motive device 114 to the requested supplemental power. The output circuit 212 of the CDA control system 206 transmits the command to the electric motive device 114 to provide the supplemental power. For example, if the CDA control system 206 receives a power request above the maximum power output, the output circuit 212 sends a command to the electric motive device 114 to supplement the power of the engine 103, the amount of supplemental power corresponding to the difference between the current power output and the power request. In some embodiments, the output circuit 212 may send a signal to the electric motive device 114 for the supplemental power to increase from zero, approximately zero, or another small amount to the desired amount over a period of time so to prevent sudden acceleration. The CDA control system 206 is also structured to send a command to the electric motive device 114 to deactivate or stop the electric motive device 114 when supplemental power is no longer needed, such as when the engine 103 provides sufficient power. The input circuit may receive information regarding the electric motive device 114 before and/or during activation, such as a battery state of charge, etc. If the battery state of charge is below a minimum threshold, the control circuit 210 may not command the supplemental power from the electric motive device 114 and instead activate one or more of the deactivated cylinders to meet the power demand.

While the electric motive device 114 is providing the supplemental power, the CDA control system 206 is further structured to monitor cylinder contents via direct assessment and/or an estimation based on information received from the sensors 110, which may include an oxygen sensor, a NOx sensor, PM sensor, mass-air-flow sensor, intake manifold sensor, exhaust manifold pressure sensor, and/or the like. The CDA control system 206 may receive direct measurements of cylinder contents from sensors 110. For example, the control system may receive a direct measurement of the EGR fraction, the oxygen content, mass-air-flow, etc. within at least one cylinder 104. The CDA control system 206 may be structured to receive sensor data that may be processed by the control circuit 210 to estimate the cylinder contents (e.g., EGR sensor that provides an indication of an EGR amount/fraction, oxygen/air amount via an air intake oxygen sensor, etc.). For example, the CDA control system 206 may receive sensor data from sensors 110 located upstream (e.g., in fuel lines, in air intakes, etc.) of the cylinders 104. Based on the received sensor data, the control circuit 210 estimates (e.g., using a look-up table, using an algorithm, a model, etc.) the cylinder contents. More specifically and as an example, the CDA control system 206 may receive sensor data from a sensors 110 located in an air intake channel and in an exhaust intake channel. Based on the received data, the control circuit 210 determines the amount of air and exhaust that will be within at least one cylinder 104 and calculates the EGR fraction for the at least one cylinder 104. The CDA control system 206 may also predict future cylinder contents by extrapolating information received from sensors 110. For example, if the CDA control system 206 receives a number of measurements of air-to-fuel ratio over a period of time, the control circuit 210 may extrapolate (e.g., via a regression analysis) what the air-to-fuel ratio may be in the future. Once determined by the CDA control system 206, the cylinder contents information may be stored and accessed in the memory device 204. The CDA control system 206 may continuously monitor the cylinder contents or may monitor the cylinder contents periodically (e.g., every 1s, every 2s, every 3s etc.).

Based on the monitored cylinder contents, the CDA control system 206 is structured to determine when inactive cylinder 104 may be reactivated. To prevent NOx and PM spikes, cylinder contents are monitored until they are at a desired composition for reactivation. The desired contents may be predetermined ranges of cylinder contents based on operation of the engine (e.g., a current air-to-fuel ratio, a current EGR amount, etc.). Alternatively or additionally, the control circuit 210 determines the desired contents based on the situation (e.g., power request, temperature, speed, etc.). In some embodiments, the desired contents for reactivation may be an EGR fraction that is roughly equivalent across at least a subset of the cylinders 104. The CDA control system 206 may determine when each cylinder 104 may be activated independently of the other cylinders 104, or may determine when all of the cylinder 104 may be activated. Once the CDA control system 206 determines a cylinder 104 has a desired contents, the output circuit 212 sends a signal to the valve actuation system 122 to activate the corresponding cylinder 104. For example, if the CDA control system 206 determines that the EGR fraction and the air-to-fuel ratio within the cylinder 104 are within a desired EGR fraction and air-to-fuel ratio range, the output circuit 212 sends a signal to the valve actuation system 122 to activate the corresponding cylinder 104. If the cylinder contents are determined by the control circuit 210 to be undesired for reactivation, the output circuit 212 of the CDA control system 206 sends signals to the valve actuation system 122 to cycle the cylinders 104.

In some embodiments, the CDA control system 206 sends signals to the valve actuation system 122 to operate valves 106 in a typical operating pattern while cycling the cylinders 104. During this time, the CDA control system 206 receives information regarding intake contents for the deactivated cylinder(s) (e.g., an air-to-fuel ratio, an oxygen value, an EGR value, etc. wherein the values are at an instant in time or over a predefined amount of time) and receives information regarding contents expelled to the exhaust manifold. Based on this information, the CDA control system 206 determines when the contents are at or approximately at a desired composition/mixture for reactivation. Alternatively, in some embodiments, the CDA control system 206 sends signals/commands to the valve actuation system 122 to operate valves 106 outside of a typical operating pattern while cycling the cylinders 104, to reach desired cylinder contents faster than when using a typical operating pattern. In some embodiments, the output circuit 212 may command only the cylinders 104 with undesired contents to be refreshed (e.g., refresh the contents of the cylinder via opening and/or closing the intake and/or exhaust valves associated with those cylinders). In some embodiments, the output circuit 212 cycles the cylinders 104 a predefined number (e.g., 1, 2, 3, 4, 5, 6, etc.) of times. Further, at least one of the intake or exhaust valves may be open during the cycling so that the contents of the at least one deactivated cylinder are modified until a desired content composition is obtained (e.g., based on information from one or more sensors upstream and/or downstream of the cylinder, such as an oxygen content value, an EGR value, etc.). Once the control circuit 210 determines that the cylinder contents are desired for reactivation, the output circuit 212 commands the valve actuation system 122 to activate the at least one cylinder 104 with the desired contents. In some embodiments, the CDA control system 206 only activates cylinders 104 until the total number of active cylinders 104 are able to provide power at or above the power request.

Figure 3:
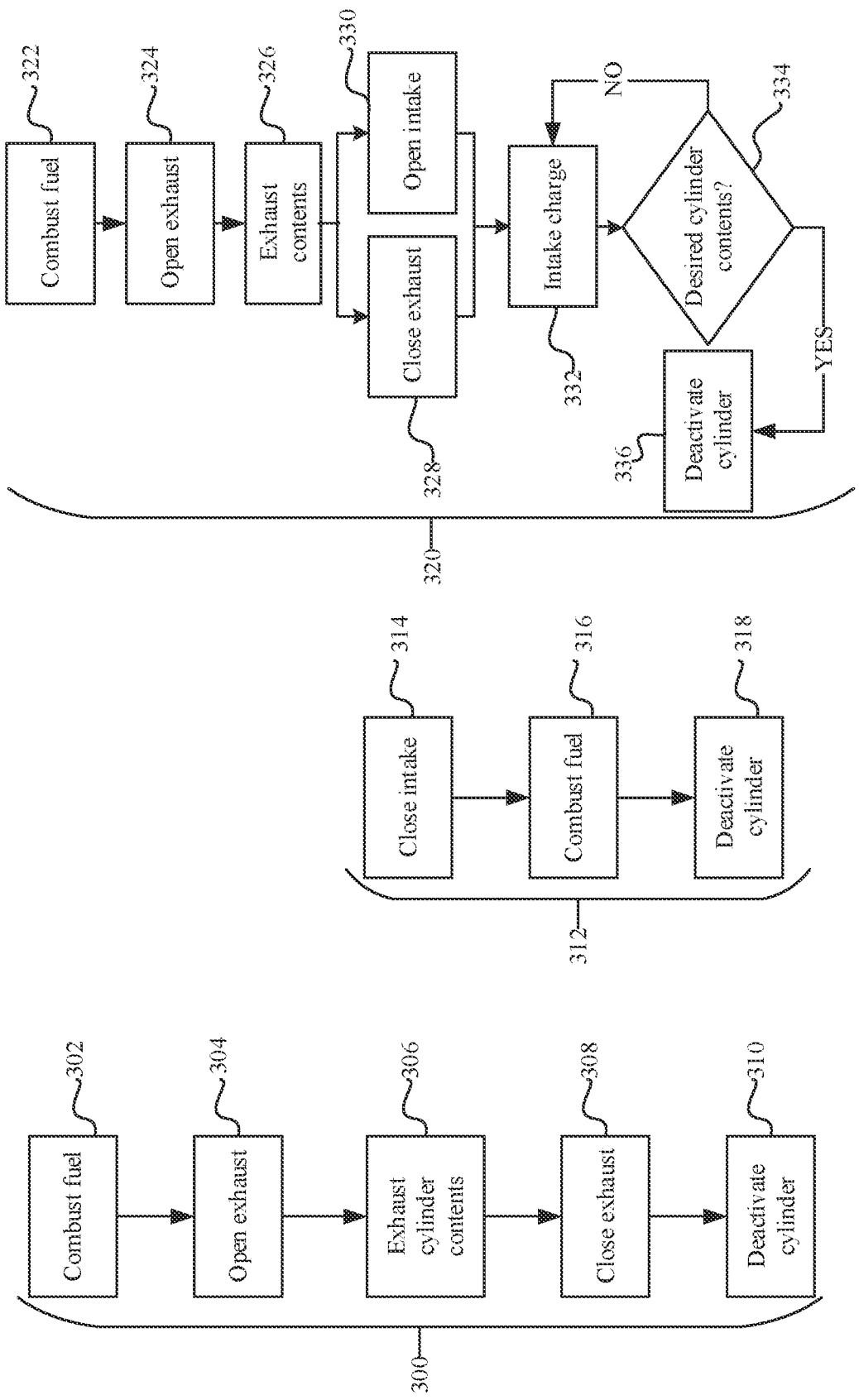
FIG. 3A is a flow diagram of a method of vacuum trapping a cylinder of a vehicle system, according to an exemplary embodiment.
FIG. 3B is a flow diagram of a method of hot trapping a cylinder of a vehicle system, according to an exemplary embodiment.
FIG. 3C is a flow diagram of a method of cold trapping a cylinder of a vehicle system, according to an exemplary embodiment.

Referring generally to FIGS. 3A-3C, various cylinder deactivation methods are shown, according to example embodiments. Cylinder deactivation includes closing the intake and exhaust valves of a cylinder, such as cylinders 104, in an internal combustion engine. The intake and exhaust valves of the cylinder 104 are kept close until the cylinder 104 is reactivated. Movement of the valves is controlled by the valve actuation system 122, which is controlled by the controller 118. Thus, the controller 118 controls activation and deactivation of the cylinders 104 during CDA operating mode. Cylinder deactivation can trap different types of cylinder contents associated with different stages of combustion (e.g., intake, compression, exhaust, etc.) within the combustion chamber. The methods shown in FIGS. 3A-3C relate to a single cylinder 104 of the system 100, but the methods may be applied to all of the cylinders 104 of the system 100. Cylinders 104 of the system 100 may use different methods or may all use the same method. Furthermore, certain cylinders 104 may be at a different stage of a method, or all or some of the cylinders may be at the same stage of a method of FIGS. 3A-3C.

Referring first to FIG. 3A, a flow diagram of a method of vacuum trapping the contents of a cylinder 104 is shown, according to an example embodiment. The vacuum trapping method 300 is a method for emptying the contents of a cylinder 104 prior to deactivating the cylinder 104. During the vacuum trapping method 300, the intake valve of the cylinder 104 is closed. At process 302, the remaining fuel in the cylinder 104 is combusted (e.g., via compression-ignition in the engine shown herein, via a spark in an SI engine, or other means in other applications). Combustion produces exhaust gases, which may include NOx and PM. At process 304, the exhaust valve of the cylinder 104 is opened, allowing for the exhaust gas within the combustion chamber to be exhausted from the combustion chamber at process 306. At process 308, after at least a portion of the exhaust gases have been exhausted, the exhaust valve is closed. With the intake valve and the exhaust valve closed, additional contents are or are substantially prevented from entering the cylinder 104. At process 310, the cylinder 104 is deactivated, wherein the valves 106 of the cylinder 104 are closed or substantially closed until the cylinder 104 is reactivated. The resulting cylinder 104 is vacuum trapped, as the cylinder 104 does not contain any combustion gases or any other gases, e.g., a vacuum. The vacuum trapping method 300 may be repeated for each of a plurality of cylinders 104 independently, or the vacuum trapping method 300 may occur in each of a plurality of cylinders 104 simultaneously.

Referring now to FIG. 3B, a flow diagram of a method of hot trapping the contents of a cylinder 104 is shown, according to an example embodiment. The hot trapping method 312 is a method of capturing exhaust in a cylinder 104 and deactivating the cylinder 104 with the hot exhaust gas inside the cylinder. The exhaust valve is closed throughout the entirety of the hot trapping method 312. The hot trapping method 312 begins with a desired charge for combustion inside the cylinder 104. At process 314, the intake valve is closed. Closing the intake and exhaust valves prevents or substantially prevents gases and particulate matter from entering or leaving the combustion chamber of the cylinder 104. At process 316, the contents of the cylinder 104 are combusted (e.g., via compression-ignition in the engine shown herein, via a spark in an SI engine, or other means in other applications). At process 318, the cylinder 104 is deactivated with the relatively hot exhaust gas remaining in the combustion chamber of the cylinder 104. Because of the presence of relatively hot exhaust gases being now trapped in the deactivated cylinder, this process is known as hot trapping. The valves 106 of the cylinder 104 are closed until the cylinder 104 is reactivated. The hot trapping method 312 may be repeated for each of a plurality of cylinders 104 independently, or the hot trapping method 312 may occur in each of a plurality of cylinders 104 simultaneously.

Referring now to FIG. 3C, a flow diagram of a method of cold trapping the contents of a cylinder 104 is shown, according to an example embodiment. In contrast to the hot trapping method described above, the cold trapping method 320 is a method of deactivating the cylinder 104 prior to combustion. At process 322, the contents of the combustion chamber are combusted. The exhaust valve is then opened at process 324, allowing for the exhaust gases and other matter produced during combustion to be exhausted through the exhaust valve. At process 328, the exhaust valve is closed, while the intake valve is simultaneously opened at process 330. At process 332, the cylinder 104 takes in a desired charge for combustion. At process 334, the cylinder 104 is monitored, by the controller 118, for desired cylinder 104 contents. In some embodiments, the desired cylinder 104 contents may be a range of values for various constituents. Monitoring for desired contents may include monitoring the fraction of recirculated exhaust gas and the air-to-fuel ratio immediately prior to commanding the deactivation. Process 334 may be facilitated by at least one sensor 110 coupled to the controller 118, or may be approximated by a computer configured to approximate the contents of a cylinder 104. If the cylinder 104 is found to have undesired contents, the cold trapping method 320 returns to 412 to cycle the cylinder 104. Process 332 and process 334 may be repeated until the contents of the cylinder 104 are desired for reactivation. In some embodiments, process 334 is omitted and process 432 is repeated a predetermined number of times before proceeding to process 436. In some embodiments, process 332 is repeated a predetermined number of times. If the cylinder 104 is found to have the desired contents, then the method proceeds to process 336. In some embodiments, process 334 may be omitted and the cold trapping method 320 may proceed directly to process 336. At process 336, the cylinder 104 is deactivated with the combustion gases remaining in the combustion chamber of the cylinder 104, also known as cold trapping. The cold trapping method 320 may be repeated for at least one of the plurality of cylinders 104 independently, or the cold trapping method 320 may occur in each of the plurality of cylinder 104 simultaneously. In some embodiments, cold trapping method 320 is preferred over the vacuum trapping method 300 and the hot trapping method 312, as the cold trapping method 320 can capture a predetermined amount of cylinder contents, such that when the cylinder 104 is reactivated, the system 100 can avoid NOx and PM spikes if the predetermined amount of cylinder contents is desired.

Figure 4:
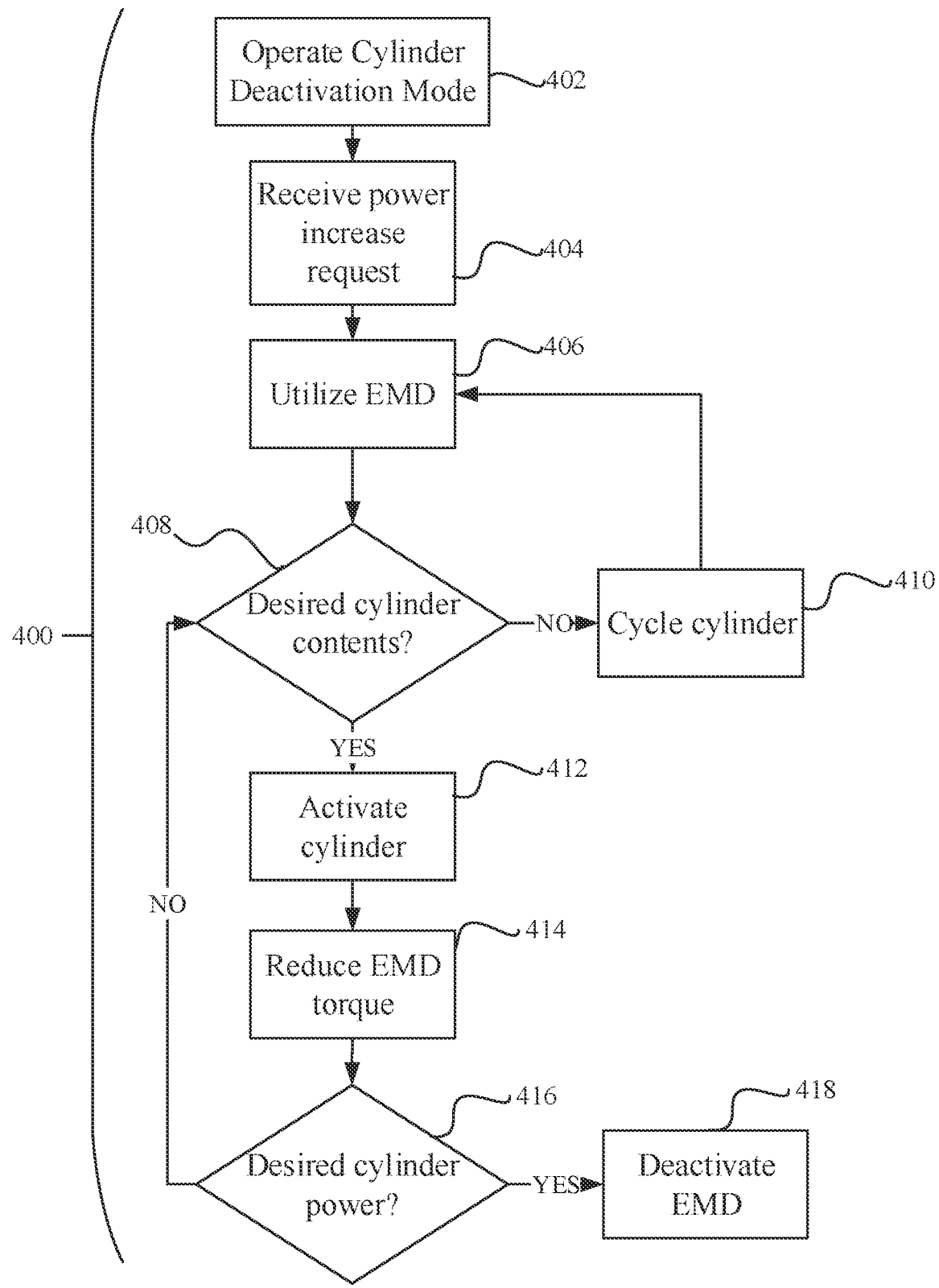
FIG. 4 is a flow diagram of a method for supplementing power with an electric motive device during cylinder reactivation from a cylinder deactivation operating mode for an engine, according to an exemplary embodiment.
Figure 5:
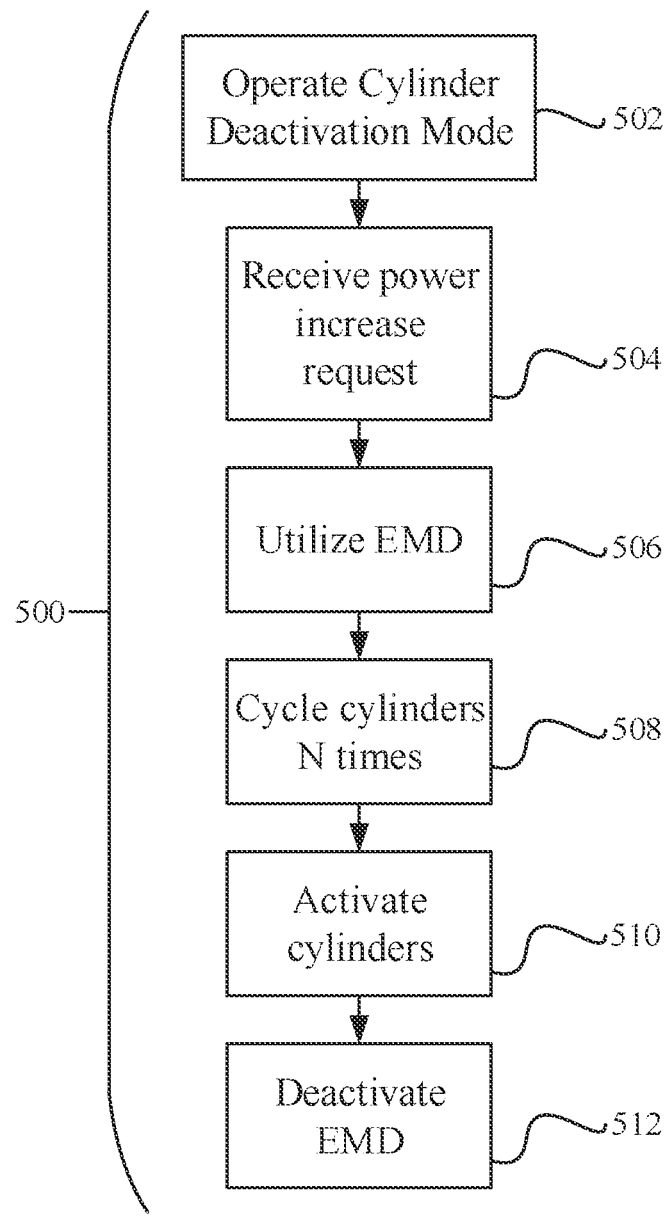
FIG. 5 is another flow diagram of a method for supplementing power with an electric motive device during cylinder reactivation from a cylinder deactivation operating mode for an engine, according to another exemplary embodiment.
Figure 6:
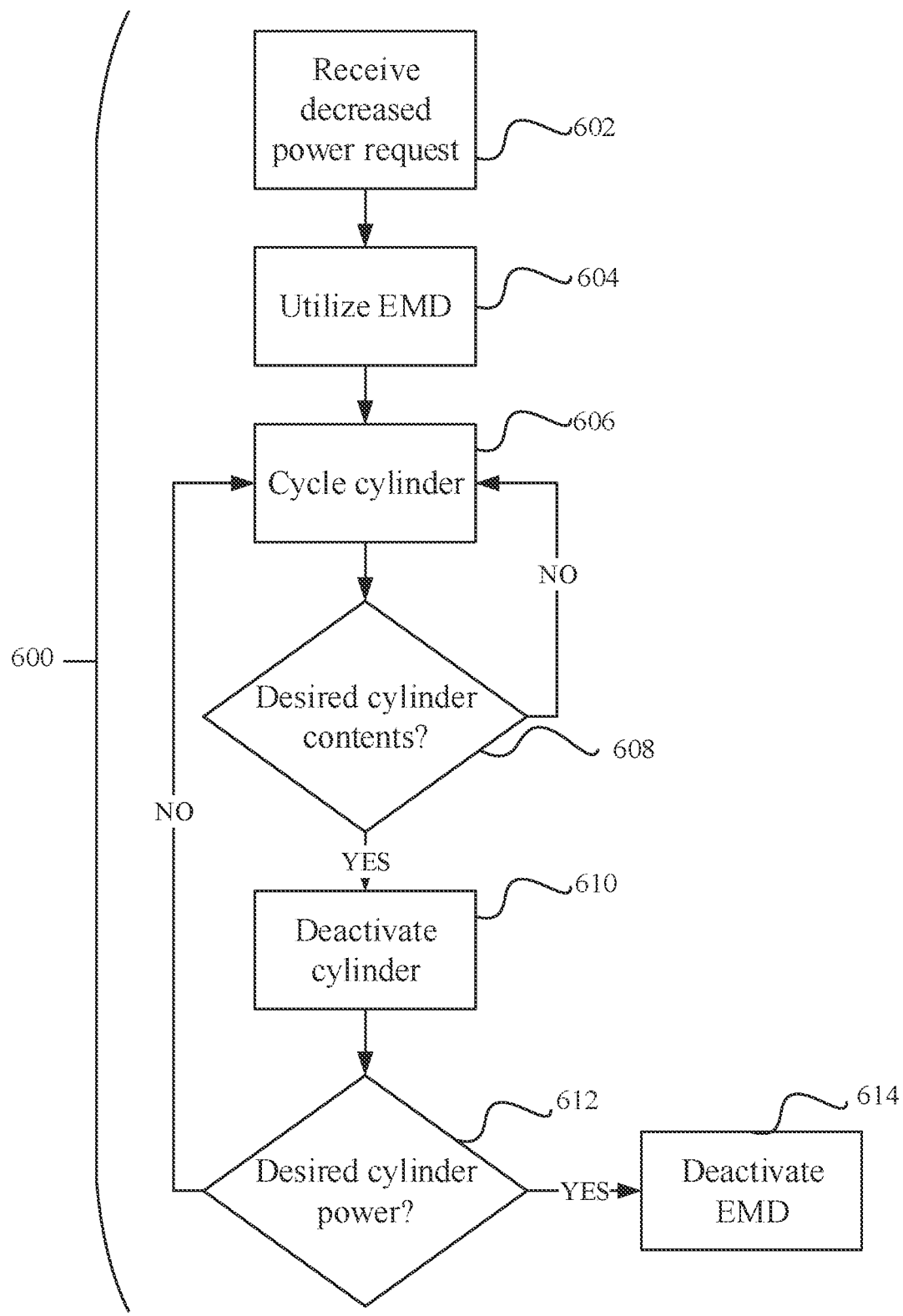
FIG. 6 is a flow diagram of a method for supplementing power with an electric motive device during cylinder deactivation for a cylinder deactivation operating mode for an engine, according to another exemplary embodiment.

Referring generally to FIGS. 4-6, methods of utilizing an electric motive device (EMD), such as electric motive device 114 to provide supplemental power when a power request is received from an input device 120 by the controller 118 during a CDA operating mode are depicted, according to various example embodiments. Providing power from the electric motive device before reactivating one or more deactivated cylinders to meet, substantially meet, or attempt to meet the increased power demand from the operator may avoid transient undesired exhaust gas emissions characteristics (e.g., NOx and PM emissions above a predefined amount/threshold). In this regard, the one or more deactivated cylinders may have contents therein (e.g., particulate matter, oxygen, hydrocarbons, etc.) that may produce an undesired emission characteristic(s) when reactivated because the content mixture may not be tuned/calibrated for the present combustion conditions (e.g., a mixture of charge air, EGR, etc. to enable stoichiometric combustion or a desired rich or lean combustion). By delaying cylinder reactivation, the one or more deactivated cylinders are cycled by the controller 118 until a determined or estimated contents of the one or more deactivated cylinders may coincide with a desired mixture for combustion that alleviates potential exhaust gas emission spikes. Moreover, the additional power requirement may be met by the electric motive device. Accordingly, a realization of operability of the vehicle in combination with minimizing undesired transient emissions may be experienced. In some embodiments, the instructions to complete the methods described in reference to FIGS. 4-6 may be stored in the memory device 204 of the controller 118.

FIG. 4 is flow diagram of a method of supplementing power with an electric motive device, such as electric motive device 114, according to an exemplary embodiment. The reactive activation method 400 includes utilizing an electric motive device 114 to supplement power (e.g., for the vehicle) after receiving a request for an increase in power output. At process 402, the controller 118 commands the engine 103 to operate in a CDA operating mode. As mentioned above, the CDA operating mode may include a skip fire or dynamic skip fire operating mode, a fixed cylinder CDA operating mode, or another type of CDA operating mode. During the CDA operating mode, less than all of the cylinders 104 of the engine are active (i.e., a subset of the cylinders are deactivated). Accordingly, the system 100 can only produce a limited amount of power, as not all cylinders 104 are activate.

At process 404, a request for increased power is received. For example, the controller receives a signal from the input device 120 requesting additional power output above a current power output from the engine 103. For example, an accelerator pedal may be depressed relatively further than the accelerator pedal was depressed for the past predefined amount of time. The power request may be based on a continual request (e.g., more than a predefined amount of time, such as two seconds) or be instantaneous. To determine the current power output, the controller 118 may determine an average power output for a past predefined amount of distance and/or time. The controller 118 may then add an upper threshold to this average. The upper threshold may correspond to the maximum power that the number of activated cylinders 104 of the system 100 may produce without reactivating any deactivated cylinders 104. If the power request is greater than this threshold, the reactive activation method 400 may proceed. If the power request is below this threshold, the engine 103 is able to produce the desired power without activating any additional cylinders and does not require supplemental power. By employing this threshold, transient power fluctuations that may be caused by short grade situations may avoid triggering the reactive activation method 400 from proceeding. Thus, in this embodiment, the supplemental power request may typically cause reactivation of at least one deactivated cylinder. There may also be an analysis by the controller 118 of the battery 116, facilitated by a sensor coupled to the battery 116 and the controller 118. If the state of charge or other battery characteristic is above a threshold as determined by the controller 118, then the controller 118 may direct the electric motive device 114 to draw power from the battery 116.

At process 406, the controller 118 utilizes the electric motive device 114 to supplement power. At process 406, the controller 118 may determine the power provided by the currently activated cylinders 104 of the system 100 and may command the electric motive device 114 to supplement the power provided by the currently activated cylinder 104 so that the drivetrain 112 may provide the power required by the request received at process 404. In some embodiments, the controller 118 sends the electric motive device 114 instructions to deliver an amount of power corresponding to the number of deactivated cylinders 104. For example, if one cylinder 104 is deactivated, the controller 118 commands the electric motive device 114 to provide a first amount of power. If two cylinders 104 are deactivated, the controller 118 commands the electric motive device 114 to provide a second amount of power, the second amount of power greater than the first amount of power. If three cylinders 104 are deactivated, the controller 118 commands the electric motive device 114 to provide a third amount of power, the third amount of power greater than the second amount of power. This may be extended to any number of deactivated cylinders 104.

At process 408, the controller 118 monitors the contents of the cylinder 104 and compares the cylinder contents to a desired level for reactivation, as described in reference to FIG. 2. In some embodiments, the valve actuation system 122 cold trapped the cylinders 104, by following the cold trapping method 320, such that the cylinders 104 have the desired cylinder contents prior to beginning the reactive activation method 400 and process 408 may be skipped. In some embodiments, the desired cylinder 104 contents may be a range of values specific to various cylinder constituents. For example, the controller 118 may receive signals from sensors 110 located proximate an air intake and fuel injector. The controller 118 may then determine the air-to-fuel ratio by extrapolating how much air and fuel would be within the cylinder 104 from the measurements taken by the sensors located in the air intake and the fuel injector. When determining the EGR fraction or amount, the controller 118 may, for example, receive signals from sensors 110 located in an exhaust intake and an air intake. The controller 118 may then calculate or determine the amount of exhaust and air in the cylinder 104 by extrapolating the reading from the sensors 110. The controller 118 may determine the EGR fraction by determining a ratio of exhaust to air within the cylinder 104. Once the cylinder contents are determined, the controller 118 compares the cylinder contents with a desired level to determine if the cylinder contents are as desired for activation. The desired level may be a predetermined range stored in the controller memory. The desired level may also be when the EGR fraction, or other cylinder contents parameter, are roughly equal across at least a subset of cylinders 104.

If the cylinder contents are determined to be undesired for activation, the controller 118 sends signals to the valve actuation system 122 to cycle the cylinder 104 at process 410. The controller 118 may determine and send signals/commands/etc. corresponding to when the valve actuation system 122 should operate the valves 106 of the cylinder 104 during cycling (e.g., open, close, partially open the valves), outside of the typical operating pattern of the valves 106. While the cylinder 104 is cycled at process 410, the system 100 continues to utilize the electric motive device 114. Process 408 and process 410 repeat until the cylinder 104 is determined to have the desired cylinder contents. Once the cylinder contents are determined to be desired for activation, the cylinder 104 is activated at process 412. The activated cylinder 104 can then provide the drivetrain 112 with additional power. At process 414, the controller 118 commands the electric motive device 114 to reduce the amount of power supplemented to drivetrain 112 by an amount equal to that of the additional power provided by the activated cylinder 104.

At process 416, the controller 118 determines whether the engine 103 provides the requested power, independently of the electric motive device 114. If the controller 118 determines the engine 103 provides the requested power, the electric motive device 114 is deactivated. If the controller 118 determines the engine 103 does not provide the requested power, the method returns to process 408 such that additional deactivated cylinder 104 may be activated. From process 408, the process repeats until, at process 416, the activated cylinders 104 are determined to provide the requested power and the electric motive device 114 is deactivated. Alternatively, the electric motive device 114 may continue to provide power. The reactive activation method 400 is repeated for each of the cylinders 104 independently or is repeated for each of the cylinders 104 simultaneously. At process 418, the controller 118 sends signals to the electric motive device 114 to deactivate. In some embodiments, deactivation of the electric motive device 114 includes switching the electric motive device 114 from motor operation to generator operation.

FIG. 5 is flow diagram of a repeating activation method 500 of supplementing power with an electric motive device, such as electric motive device 114, according to another exemplary embodiment. The repeating activation method 500 includes utilizing an electric motive device 114 to supplement power in a drivetrain 112 after receiving a request for an increase in power. At process 502, the engine 103 is operating in CDA operating mode, wherein a number of cylinders 104 are deactivated. During CDA mode, the engine 103 can only produce a limited amount of power, as not all cylinders 104 are activated. At process 504, a request for increased power is received. For example, the controller 118 may receive a request for increased power from the input device 120. This may be an accelerator pedal being pressed in a vehicle. In some embodiments, the controller 118 determines how many cylinders 104 should be activated to meet the power request. The controller 118 may determine an average power output for a past predefined amount of distance and/or time. The controller 118 may then add an upper threshold to this average. The upper threshold may correspond to the maximum power that the number of activated cylinders 104 of the system 100 may produce without reactivating any deactivated cylinders 104. If the power request is greater than this threshold, the repeating activation method may proceed. If the power request is lower than this threshold, the engine 103 may produce the desired power without activating any additional cylinders. The power request may be based on a continual request (e.g., more than a predefined amount of time, such as two seconds) or be instantaneous. By employing this threshold, transient power fluctuations (e.g., that may be caused by short grade situations) may avoid triggering the repeating activation method 500 from proceeding. There may also be an analysis by the controller 118 of the battery 116, facilitated by a sensor coupled to the battery 116 and the controller 118. If the state of charge or other battery characteristic is above a threshold as determined by the controller 118, then the controller 118 may direct the electric motive device 114 to draw power from the battery 116.

At process 506, the electric motive device 114 is utilized to supplement power from the engine 103. At process 506, the controller 118 may determine the power provided by the currently activated cylinders 104 of the system 100. Based on the determination, the controller 118 may command the electric motive device 114 to supplement the power so that the drivetrain 112 may provide the power required by the request received at process 504. In some embodiments, the controller 118 commands the electric motive device 114 to deliver an amount of power corresponding to the number of deactivated cylinders 104. For example, if one cylinder 104 is deactivated, the controller commands the electric motive device 114 to provide a first amount of power. If two cylinders 104 are deactivated, the controller 118 commands the electric motive device 114 to provide a second amount of power, the second amount of power greater than the first amount of power. If three cylinders 104 are deactivated, the controller 118 commands the electric motive device 114 to provide a third amount of power, the third amount of power greater than the second amount of power. This may be extended to any number of deactivated cylinders 104.

At process 508, the controller 118 commands the valve actuation system 122 to cycle the deactivated cylinders 104 a number of times, where the number is a predetermined number (e.g., 1, 2, 3, 4, 5, 6, 7, 8, 9, 10, etc.). In some embodiments, the number may be different for different cylinders 104. In some embodiments, the number may change according to a variety of factors (e.g., requested power, temperature, air density, fuel type, etc.). For example, the controller 118 may determine the N number responsive to data from the sensors 110 and any other sensors associated with the system 100. In some embodiments, the controller 118 commands the valve actuation system 122 to operate the valves 106 outside of the typical operating pattern while cycling the cylinders 104. For example, the controller 118 may command the valve actuation system 122 close the valves 106 of a cylinder 104 once the cylinder 104 is determined to have desired cylinder contents, prior to completing the predetermined number of cycles. Cycling the cylinders 104 refreshes the cylinder contents and can equalize or substantially equalize the contents of the cylinders 104, decreasing the likelihood of a NOx spike, a PM spike, or other unwanted emissions characteristic. In some embodiments, the cylinders 104 are cycled a predetermined amount of time (e.g., 3 seconds, 4 seconds, 5 seconds, etc.). After the cylinders 104 are cycled, the controller 118 commands the valve actuation system 122 to activate the cylinders 104 at process 510. Once the cylinders 104 are activated, the controller 118 commands the electric motive device 114 to deactivate at process 512. Alternatively, the electric motive device 114 may continue to be on. In some embodiments, the repeating activation method 500 only occurs for a subset of the deactivated cylinder 104. For example, in a six-cylinder engine with four deactivated cylinders 104, if the controller 118 determines that only four of the six cylinders 104 provide the requested power, the controller 118 only completes the repeating activation method 500 for two deactivated cylinders 104. In some embodiments, the repeating activation method 500 is repeated for a plurality of cylinders 104 independently.

FIG. 6 is a flow diagram of a method of supplementing power with an electric motive device, such as electric motive device 114, according to another exemplary embodiment. In deactivation method 600, an electric motive device 114 provides supplemental power while deactivating cylinders 104. The deactivation method 600 deactivates cylinders 104 once the cylinders 104 have the desired contents, without or substantially without negatively impacting the power output. This allows for the cylinder 104 to be prepared for reactivation without or substantially without producing unwanted emissions, such as NOx or PM spikes.

At process 602, a request for a decrease in power is received. For example, controller 118 receives a request for a decrease in power from the input device 120 that is lower than a current power output (which may be an average power output over a predefined amount of time and/or distance, or an instantaneous power output when the request is received). This request may be in the form of a brake pedal being pressed in a vehicle, a transmission shift to a lower gear/setting, slowing a speed via a cruise control setting, a combination thereof, and so on. If the power request is less than a predefined power threshold, the deactivation method 600 may proceed. The power request may be based on a continual request (e.g., more than a predefined amount of time, such as two seconds) or be instantaneous. There may also be an analysis by the controller 118 of the battery 116 and the controller 118. If the state of charge or other battery characteristic is above a threshold as determined by the controller 118, then the controller 118 may direct the electric motive device 114 to draw power from the battery 116.

At process 604, the controller 118 commands the electric motive device 114 to provide supplemental power. The supplemental power may vary during the deactivation method 600. At process 606, the controller 118 commands the valve actuation system 122 to cycle the cylinder 104 to refresh the cylinder contents. While the cylinder 104 is cycled, it does not produce power (e.g., combustion is disabled). The electric motive device 114 provides supplemental power during this step, such that the drivetrain 112 may still provide the requested power. The controller 118 may command the electric motive device 114 to provide supplemental power corresponding to the number of inactive cylinders 104.

At process 608, the controller 118 determines the cylinder contents as described in reference to process 408 of FIG. 4. If the cylinder contents are determined by the controller 118 to be undesired for activation, the controller 118 commands the valve actuation system 122 to again cycle the cylinder 104 at process 606. If the cylinder contents are determined by the controller 118 to be desired at process 608, the controller 118 deactivates the cylinder 104 at process 610. In some embodiments, process 608 may be omitted and process 606 may be repeated a number of times before proceeding to process 610.

At process 612, controller 118 determines the power output of the remaining activated cylinders 104, independent of the power provided by the electric motive device 114. If the power output is determined to be equivalent or approximately equivalent to that of the power request, the controller 118 commands the electric motive device 114 to deactivate at process 614. Alternatively, the electric motive device 114 may continue to be on. If the power output is determined to be not or substantially not equal to the power request, the deactivation method 600 returns to process 606, such that the controller 118 cycles and later deactivates another cylinder 104. In some embodiments, the deactivation method 600 is completed for multiple cylinders 104 simultaneously.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled direction to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that circuit A communicates directly with circuit B (i.e., no intermediary) or communicates indirectly with circuit B (e.g., through one or more intermediaries).

While circuits with particular functionality is shown in FIG. 2, it should be understood that the controller 118 may include any number of circuits for completing the functions described herein. For example, the activities and functionalities of certain circuits may be combined in multiple circuits or as a single circuit. Additional circuits with additional functionality may also be included. Further, the controller 118 may further control other activity beyond the scope of the present disclosure.

As mentioned above and in one configuration, the "circuits" may be implemented in machine-readable medium storing instructions for execution by various types of processors, such as the processor 202. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims. Additionally, any element disclosed in one embodiment may be incorporated or utilized with any other embodiment disclosed herein.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
a controller coupled to an internal combustion engine and an electric motive device, the controller comprising:
a processor; and
a memory coupled to the processor, the memory storing instructions that, when executed by the processor, cause the controller to:
command the internal combustion engine to operate in a cylinder deactivation mode whereby at least one cylinder of a plurality of cylinders of the internal combustion engine is deactivated;
receive a power request exceeding a current power output from the internal combustion engine;
command the electric motive device to provide a supplemental power output based on the received power request; and
subsequent to commanding the electric motive device to provide the supplemental power output, activate the at least one cylinder of the plurality of cylinders of the internal combustion engine.

2. The system of claim 1, wherein subsequent to commanding the electric motive device to provide the supplemental power output, the instructions, when executed by the processor, further cause the controller to implement a predefined time delay before activating the at least one cylinder of the plurality of cylinders of the internal combustion engine.

3. The system of claim 1, wherein subsequent to commanding the electric motive device to provide the supplemental power output, the instructions, when executed by the processor, further cause the controller to cycle the at least one cylinder of the plurality of cylinders before activating the at least one cylinder of the plurality of cylinders of the internal combustion engine.

4. The system of claim 1, wherein the instructions, when executed by the processor, further cause the controller to monitor a content of the at least one cylinder of the plurality of cylinders before the at least one cylinder is deactivated, and wherein the monitored content is stored in the memory of the controller.

5. The system of claim 4, wherein the monitored content includes an exhaust gas recirculation (EGR) value regarding EGR in the at least one deactivated cylinder and a previously commanded air-to-fuel ratio for the at least one cylinder before the at least one cylinder was deactivated.

6. The system of claim 5, wherein the instructions, when executed by the processor, further cause the controller to compare the EGR value and the previously commanded AFR ratio to a predefined threshold, and based on the EGR value and the previously commanded AFR ratio exceeding the predefined threshold, the controller opens an exhaust valve of the at least one cylinder to empty at least a portion of the content of the at least one cylinder.

7. The system of claim 1, wherein the instructions, when executed by the processor, further cause the controller to determine that the received power request relative to the current power output triggers reactivation of the at least one cylinder based on the received power request exceeding the current power output by more than a predefined amount and delaying reactivation of the at least one cylinder by commanding the electric motive device to provide the supplemental power output based on the received power request.

8. The system of claim 1, wherein the instructions, when executed by the processor, further cause the controller to command at least one of an intake valve or an exhaust valve of the at least one deactivated cylinder to open to achieve a desired contents for the at least one deactivated cylinder.

9. The system of claim 1, wherein the instructions, when executed by the processor, further cause the controller to deactivate the electric motive device after at least one cycle of the at least one deactivated cylinder.

10. The system of claim 1, wherein the electric motive device is at least one of an electric motor or a motor-generator.

11. A method for utilizing an electric motive device, the method comprising:
commanding, by a controller, an internal combustion engine to operate in a cylinder deactivation mode whereby at least one cylinder of a plurality of cylinders of the internal combustion engine is deactivated;
receiving, by the controller, a power request exceeding a current power output from the internal combustion engine;
commanding, by the controller, an electric motive device to provide a supplemental power output based on the received power request; and
subsequent to commanding the electric motive device to provide the supplemental power output, activating, by the controller, the at least one cylinder of the plurality of cylinders of the internal combustion engine.

12. The method of claim 11 further comprising:
monitoring, by the controller, a content of the at least one cylinder of the plurality of cylinders before the at least one cylinder is deactivated; and
storing, by the controller, the monitored content is stored in a memory of the controller.

13. The method of claim 12, wherein monitoring the content includes monitoring an exhaust gas recirculation (EGR) value regarding EGR in the at least one deactivated cylinder and a previously commanded air-to-fuel (AFR) ratio for the at least one cylinder before that the at least one cylinder was deactivated.

14. The method of claim 13, further comprising:
comparing, by the controller, the EGR value and the previously commanded AFR ratio to a predefined threshold; and
based on at least one of the EGR value or the previously commanded AFR ratio exceeding the predefined threshold, opening, by the controller, an exhaust valve of the at least one cylinder to empty at least a portion of the content of the at least one cylinder.

15. The method of claim 11, further comprising:
determining, by the controller, that the received power request relative to the current power output triggers reactivation of the at least one cylinder based on the received power request exceeding the current power output by more than a predefined amount and delaying reactivation of the at least one cylinder by commanding the electric motive device to provide a supplemental power output based on the received power request.

16. The method of claim 11, further comprising:
cycling, by the controller, the at least one cylinder until a content of the at least one cylinder is determined to be within a predefined tolerance of a desired mixture.

17. The method of claim 11, further comprising:
commanding, by the controller, at least one of an intake valve and an exhaust valve of the at least one deactivated cylinder to open until at least one of a desired EGR value or an oxygen value regarding the at least one deactivated cylinder is obtained.

18. A system comprising:
a controller coupled to an internal combustion engine and an electric motive device, the controller comprising:
a processor; and
a memory coupled to the processor, the memory storing instructions that, when executed by the processor, cause the controller to:
receive a power request lower than a current power output from the internal combustion engine;
command the electric motive device to provide a supplemental power output based on the received power request; and
subsequent to commanding the electric motive device to provide the supplemental power output, deactivate an at least one cylinder of a plurality of cylinders of the internal combustion engine.

19. The system of claim 18, wherein the electric motive device is at least one of an electric motor or a motor-generator.

20. The system of claim 18, wherein the instructions, when executed by the processor, further cause the controller to determine that the received power request relative to the current power output triggers deactivation of the at least one cylinder based on the received power request being lower than the current power output by more than a predefined amount and delaying deactivation of the at least one cylinder by commanding the electric motive device to provide the supplemental power output based on the received power request.

* * * * *